(12) United States Patent
Nakamura et al.

(10) Patent No.: US 8,092,956 B2
(45) Date of Patent: Jan. 10, 2012

(54) FUEL-CELL CONNECTOR

(76) Inventors: Yasuaki Nakamura, Shizuoka (JP); Minoru Kanno, Shizuoka (JP)

( * ) Notice: Subject to any disclaimer, the term of this patent is extended or adjusted under 35 U.S.C. 154(b) by 684 days.

(21) Appl. No.: 12/300,361

(22) PCT Filed: May 2, 2007

(86) PCT No.: PCT/US2007/010534
§ 371 (c)(1),
(2), (4) Date: Nov. 19, 2008

(87) PCT Pub. No.: WO2007/133446
PCT Pub. Date: Nov. 22, 2007

(65) Prior Publication Data
US 2009/0155669 A1    Jun. 18, 2009

(30) Foreign Application Priority Data
May 12, 2006   (JP) .................................. 2006-133691

(51) Int. Cl.
*H01M 8/04* (2006.01)
(52) U.S. Cl. ....................................... 429/515; 429/404
(58) Field of Classification Search .................. 429/443, 429/404, 482, 515
See application file for complete search history.

(56) References Cited

U.S. PATENT DOCUMENTS 7,115,335 B2 * 10/2006 Eggum .......................... 429/443
7,901,833 B2 *  3/2011 Takahashi et al. ............. 429/515

* cited by examiner

*Primary Examiner* — David Vu
(74) *Attorney, Agent, or Firm* — Trojan Law Offices

(57) ABSTRACT

A fuel-cell connector for releasable connection to a fuel cartridge has a cartridge-side connection element with a cartridge-side valve that opens or closes a fuel-supply opening. A connector-side valve opens and closes a fuel-receiving opening and moves, during the first insertion stage, with the cartridge-side valve and a resilient element for resisting movement in the insertion direction of a connector body unit into which the cartridge-side connection element is telescopically inserted. The connector body unit has on its outer periphery engagement means for engaging a cartridge-side connection element and a stationary mechanism part for attachment to the fuel-cell-using device. In the second insertion step, the connector body unit moves as a single unit with the cartridge-side connection element, while the fuel-receiving and fuel-supply openings are maintained in close proximity so the engagement means engages the cartridge-side connection element, whereby the fuel cartridge connects and is fixed in the connected position.

16 Claims, 12 Drawing Sheets

FUEL-CELL CONNECTOR

CROSS-REFERENCES TO RELATED APPLICATIONS

The present application is a U.S. National Stage Application under 35 U.S.C. 371 of PCT/US07/010,534, filed on May 2, 2007, which claims priority to Japanese Patent Application 2006-133691, filed on May 12, 2006.

BACKGROUND OF THE INVENTION

1. Field of the Invention

The present invention relates to connection of a fuel-cell cartridge to a fuel-cell-using device, and, more particularly, to a fuel-cell connector intended for attachment to a fuel-cell-using device and for quick connection and disconnection of the fuel cartridge.

2. Description of the Related Art

A fuel cell is known in the art as an energy-conversion device in which hydrogen ions pass through an electrolyte membrane that separates oxygen from hydrogen, methanol, or a similar fuel, whereby the chemical reaction that occurs between hydrogen and oxygen generates electricity. At the present time, fuel cells have found some practical applications since it is expected that operational temperature may be low and that the device can be reduced in size. Developments have been carried out in the direction of fuel-cell use as electrical power sources for long-lasting and continuous operation of note-book-type computers and various portable devices such as mobile phones.

Normally, a fuel cell that is used as a power source of a mobile device is built into this device, and when the fuel contained in such a source is exhausted, it can be replenished by a new portion of fuel for direct conversion into electrical energy. The aforementioned built-in fuel cells are filled with fuel by means of fuel containers (fuel cartridges) (see Patent Reference 1).

[Patent Reference 1] Japanese Unexamined Patent Application Publication (Kokai) 2006-54055

DISCLOSURE OF THE INVENTION

Problems to be Solved by the Invention

However, in order to fill the fuel cell with fuel, the aforementioned fuel cartridge should allow connection to and disconnection from a fuel-cell-using device. Since a high-concentration methanol has been developed in recent years as the fuel for the above-stated purposes, it is required to exclude the possibility of fuel leakage through the fuel-supply opening of the cartridge and through the fuel-receiving opening of the device loaded with fuel.

In particular, when during the fuel-loading operation the fuel-supply opening and the fuel-receiving opening are connected, a dead space is formed between them. The fuel penetrates into this space, and when the fuel cartridge is disconnected from the fuel-receiving device, the fuel accumulated in the dead space leaks to the outside and is lost.

Based on the above information, it is an object of the present invention to provide a fuel-cell connector that minimizes leakage of fuel to the outside during connection and disconnection of the fuel cartridge.

BRIEF SUMMARY OF THE INVENTION

A fuel-cell connector of the present invention is intended for releasable connection to a fuel cartridge having an interior filled with fuel to be supplied to a fuel cell, a fuel-supply opening which opens to the outside of the cartridge, a cartridge-side valve capable of opening or closing the aforementioned fuel-supply opening, and a cartridge-side connection element provided with the aforementioned cartridge-side valve. The connector comprises:

a fuel-receiving opening that opens to the outside and communicates with the fuel-supply opening when the fuel cartridge is connected;

a connector-side valve that opens and closes the fuel-receiving opening and performs an opening movement together with the cartridge-side valve under the effect of the first-insertion movement of the cartridge-side connection element;

a connector body unit moveable in the direction of insertion of the aforementioned cartridge-side connection element, containing the aforementioned connector-side valve and telescopically connected to the cartridge-side connection element;

a resilient element for resisting to the movement of the connector body unit in the direction of insertion; and a stationary mechanism part that surrounds the connector body unit, is provided with engagement means for engagement with the cartridge-side connection element, and is attached to a fuel-cell-using device; the connector operating so that when the aforementioned cartridge-side connection element is moved further from the first insertion position to the second insertion position, the aforementioned connector body unit is moved as a single unit with the cartridge-side connection element while the fuel-receiving opening and the fuel-supply opening are maintained in close proximity so that the aforementioned engagement means are engaged with the cartridge-side connection element, whereby the fuel cartridge is connected and fixed in the connected position.

The fuel connector of the invention further comprises a tubular connector-side element that surrounds the aforementioned connector-side valve, which projects from the fuel-receiving opening, and that projects to the side of the connection with the cartridge-side connection element, the inner surface of said connector-side connection element being telescopically fitted onto a tip of the housing in which the aforementioned fuel-supply opening is formed.

In the fuel connector of the invention, the tip of the connector-side valve is brought into contact with the cartridge-side valve so that the connector-side valve and the cartridge-side valve are moved in the opening direction.

In the fuel connector of the invention, the connector-side valve is opened ahead of the cartridge-side valve but is closed later.

In the fuel connector of the invention, on the side opposite to the fuel-receiving opening, the connector body unit is provided with a nozzle that moves integrally with the connector body unit and that has a fuel-discharge opening for discharging fuel that has been received by the fuel-receiving opening. A tip on the side of the fuel-discharge opening of the nozzle is slidingly fitted into a tubular part that contains the aforementioned fuel-inlet opening for introduction of the fuel into the fuel cell.

DETAILED DESCRIPTION OF THE DRAWINGS

Effects of the Invention

Figure 1:
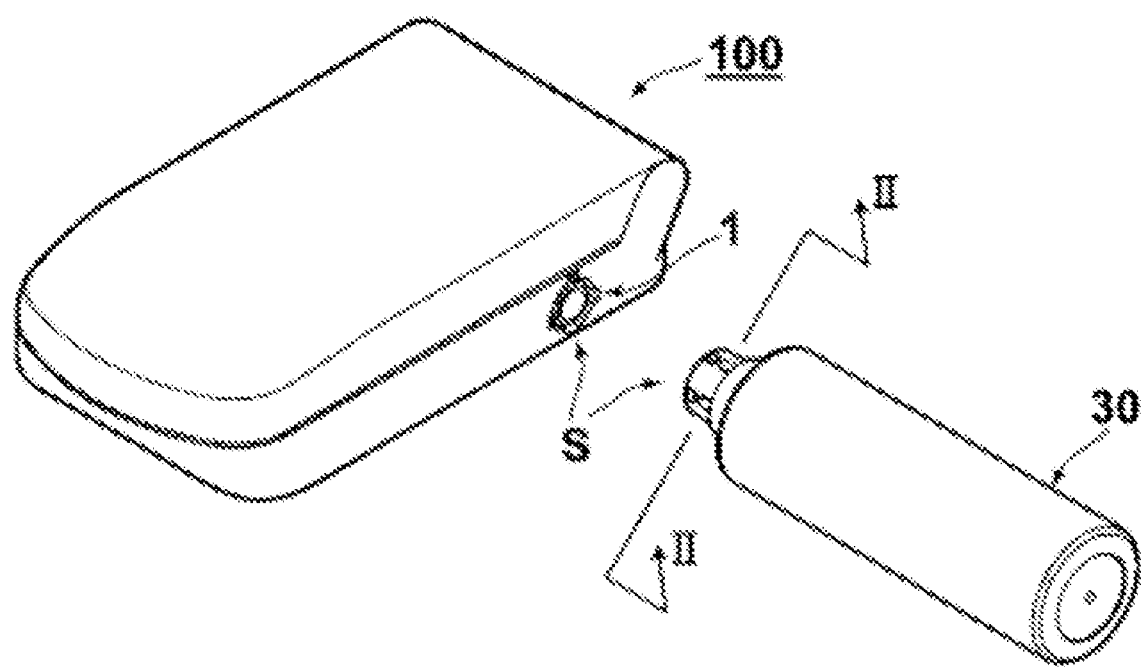
FIG. 1 is a three-dimensional view of a fuel cartridge in a state separated from a mobile phone, which is illustrated as a fuel-cell-using device that incorporates a fuel cell connector made in accordance with one embodiment of the present invention.

In accordance with the fuel-cell connector of the present invention, when, after the first insertion step in which the cartridge-side connector is pushed in the direction of insertion and opens the cartridge-side valve and the connector-side valve, the cartridge-side connector is inserted further and is transferred to the second insertion step, the connector body unit is moved so that the fuel-receiving opening and the fuel-supply opening are maintained in closed proximity to each other and are moved integrally with the cartridge-side connector. At the same time, the cartridge-side connection element engages the engagement means, thus connecting and fixing the fuel cartridge. Since in the above movement the fuel-receiving opening and the fuel-supply opening are maintained in close proximity, such a construction practically does not leave a space for penetration of fuel between the fuel-receiving opening and the fuel-supply opening. Furthermore, since the cartridge-side connection element engages the engagement means and the fuel cartridge is connected while the aforementioned openings are maintained in close proximity, at the moment of disengagement and disconnection of the fuel cartridge, practically no space exists that could be filled with fuel. This hinders conditions for accumulation of residual fuel between the fuel-receiving opening and the fuel-supply opening, thus reducing leakage of fuel to the outside.

In the fuel-cell connector of the present invention, the connector body unit has a tubular connector-side connection element that surrounds the tip of the connection-side valve, which projects from the fuel-receiving opening and which, itself, projects in order to connect with the cartridge-side connection element. When the tip of the housing with the fuel-supply opening is telescopically inserted into the connector-side connection element, a space is formed between the fuel-receiving opening and the fuel-supply opening. Formation of this space makes it possible to insert the housing tip deeper into the connector-side connection element, and this reduces the space available for penetration of fuel.

Since in the fuel-cell connector of the present invention the connector-side valve opens prior to the cartridge-side valve, and since by the time of fuel discharge from the fuel cartridge the fuel-supply opening is already in an open state, it becomes possible to prevent overflow of oil near the fuel-receiving opening and thus to smoothen reception of the fuel. Furthermore, since the connector-side valve closes later than the cartridge-side valve and since by the time of separation of the fuel cartridge the fuel-supply opening of the cartridge is already closed, it becomes possible to prevent leakage of fuel from the fuel cartridge.

The fuel-cell connector of the invention is provided with a nozzle located on the end of the connector body unit opposite to the fuel-receiving opening. This nozzle moves integrally with the connector body unit and has a fuel-discharge opening for discharging fuel received from the fuel-receiving opening. When the tip on the side of the fuel-discharge opening of the nozzle is slidingly inserted into the fuel-inlet opening formed in the tubular part for the supply of fuel to the fuel cell, and when the fuel cartridge is separated from the fuel-cell connector, the fuel-receiving opening and the fuel-supply opening are maintained in close proximity to each other, and the connector body unit, and hence, the nozzle, move in the cartridge-separation direction together with the fuel cartridge. Therefore, the volume inside the fuel-inlet opening is increased only by the volume of the section that corresponds to the displacement of the nozzle. In other words, since in the flow of fuel from the fuel-receiving opening to the fuel-inlet opening the spatial volume is increased after passing from the fuel-receiving opening to the fuel-cell side, the fuel passage acquires a negative pressure. For this reason, even if an insignificant amount of fuel is present in the gaps on the fuel-cartridge side, the aforementioned negative pressure will suck this fuel back into the interior of the fuel-cell connector. Such a condition makes it possible to reduce the residue of the fuel in the aforementioned gaps and to prevent leakage of fuel even when the fuel cartridge is separated from the fuel-cell connector.

Description of a Preferred Embodiment

Figure 2:
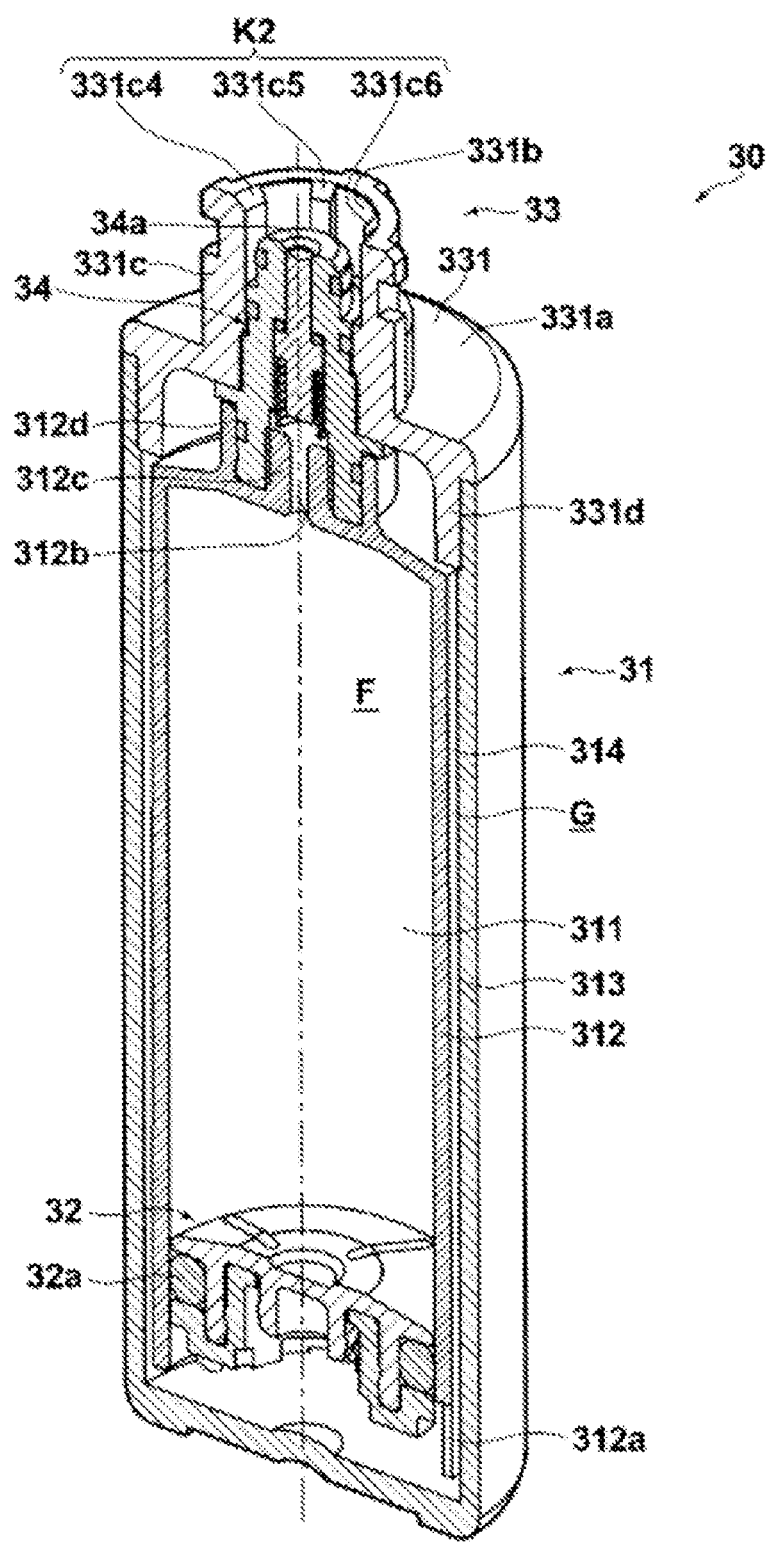
FIG. 2 is a sectional three-dimensional view of the fuel cartridge shown in FIG. 1.
Figure 3:
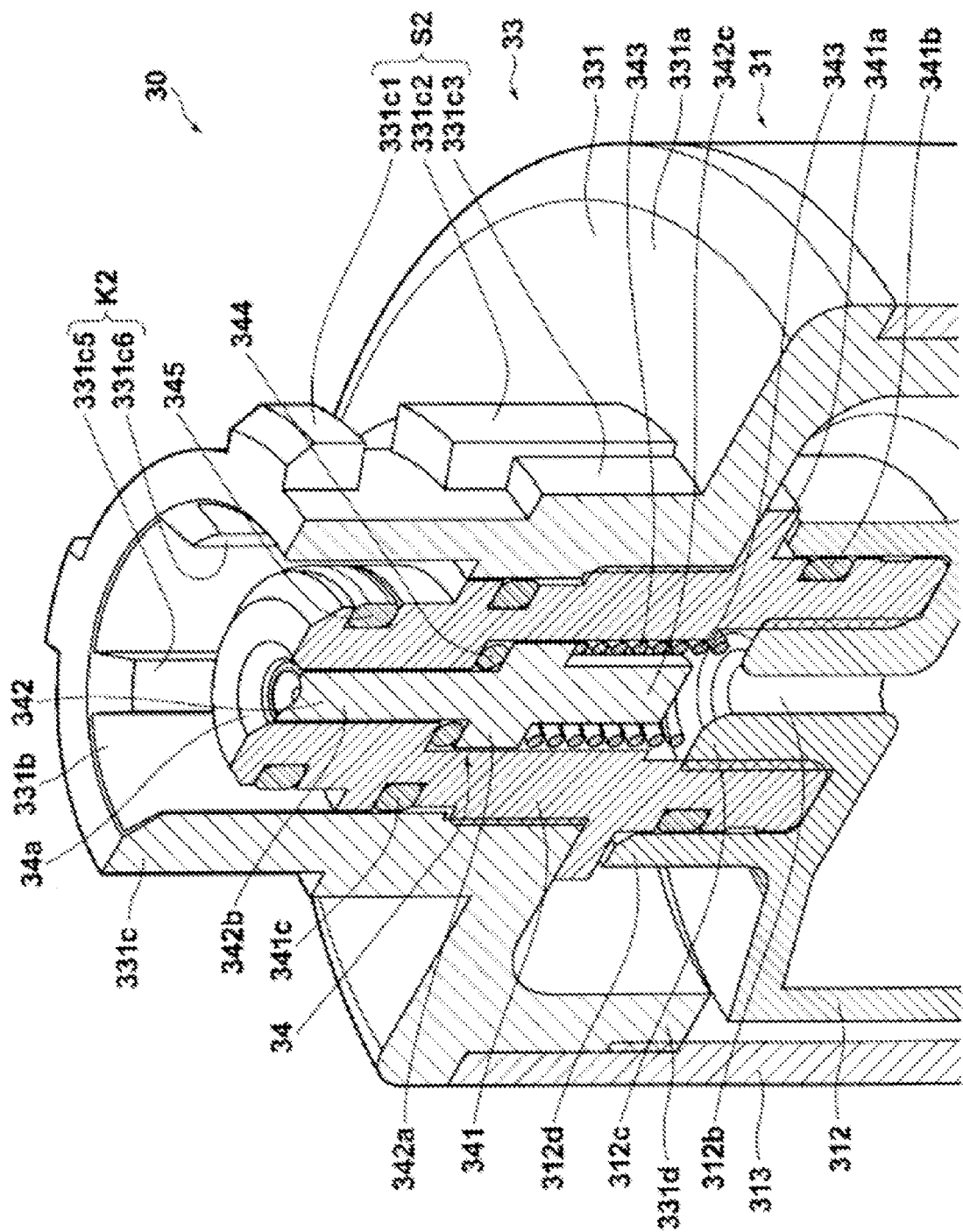
FIG. 3 is a fragment of the main part of the fuel cartridge shown on a larger scale than in FIG. 2.
Figure 4:
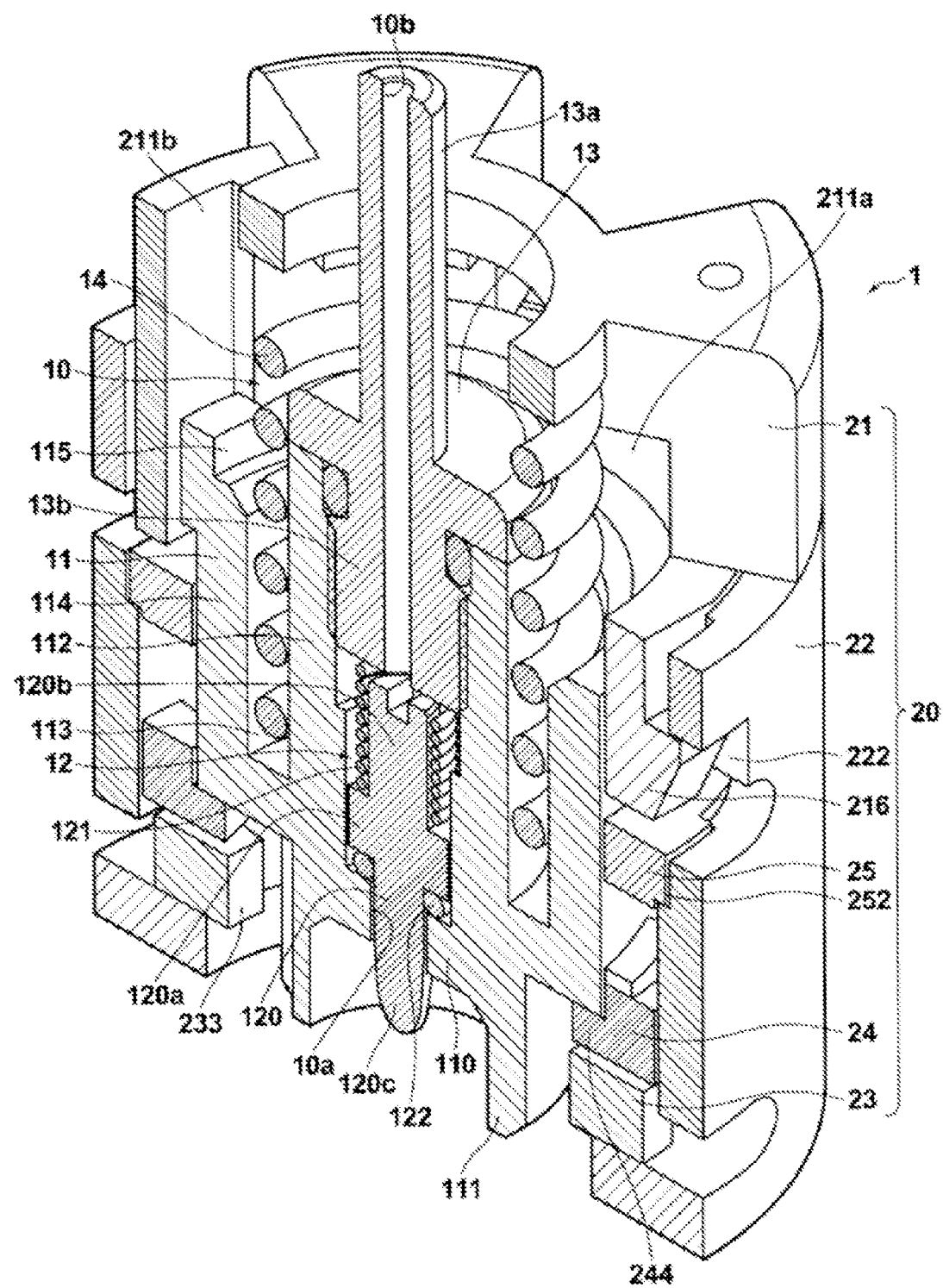
FIG. 4 is a three-dimensional sectional view of the fuel connector of the present embodiment.
Figure 5:
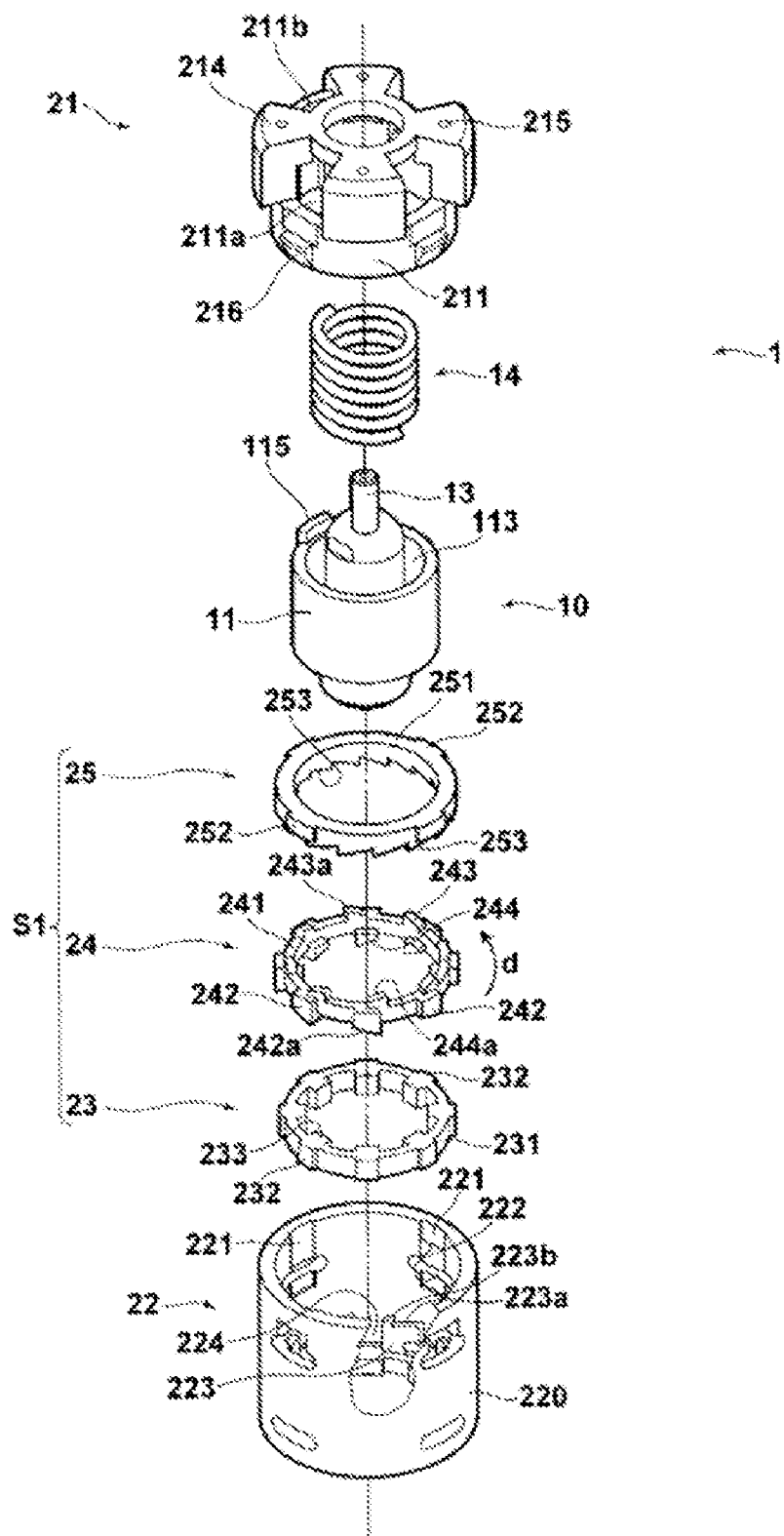
FIG. 5 is an exploded view of a part of the fuel connector shown in FIG. 4.
Figure 6:
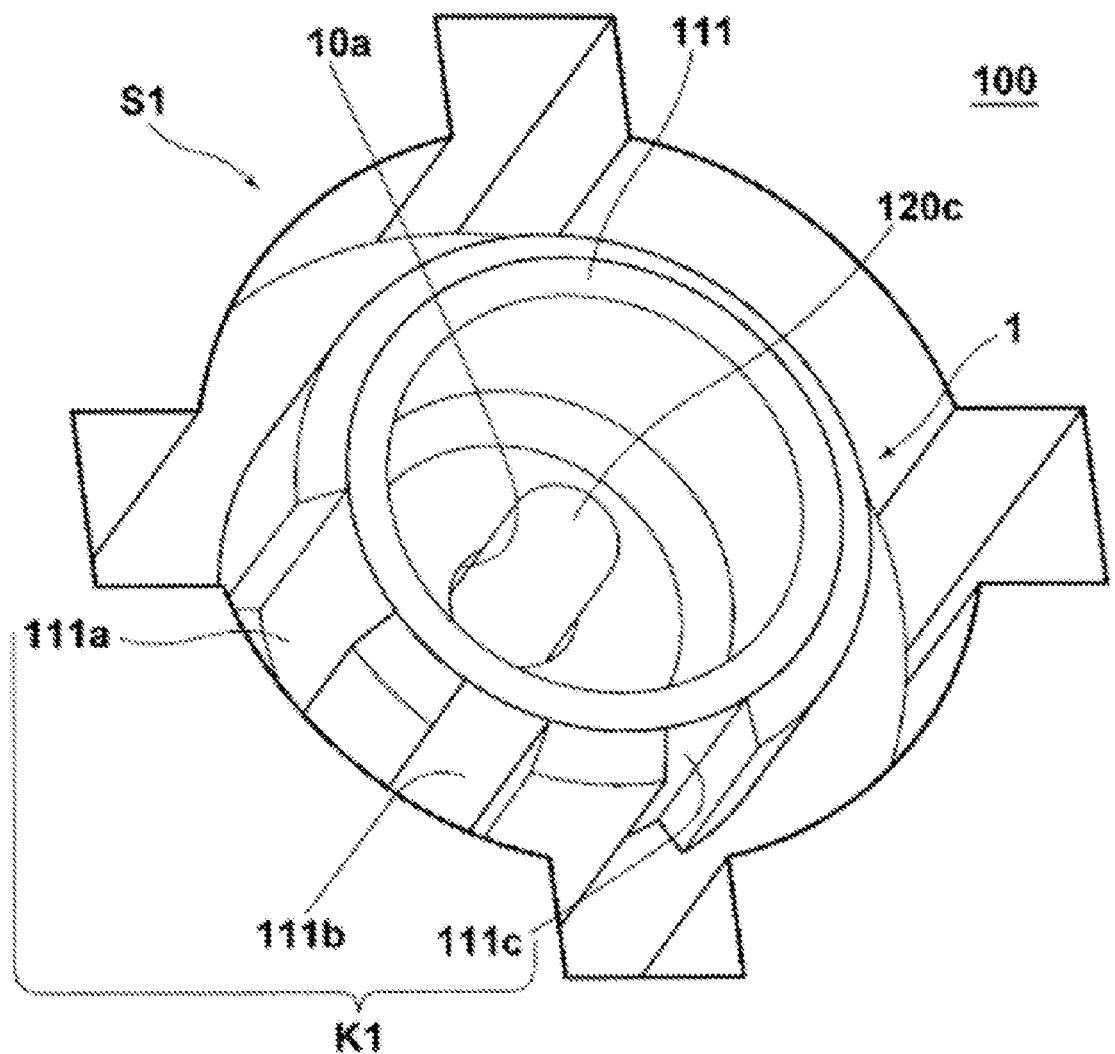
FIG. 6 is an enlarged view of a connection element on the connection side of the fuel cell connector shown in FIG. 1.

A fuel-cell connector 1 in accordance with one embodiment of the invention will now be described in more detail with reference to the attached drawings. FIG. 1 is a three-dimensional view of a fuel cartridge 30 in a state separated from a mobile phone 100 which is illustrated as a fuel-cell-using device that incorporates a fuel cell connector made in accordance with one embodiment of the present invention. FIG. 2 is a sectional three-dimensional view of the fuel cartridge 30 shown in FIG. 1. FIG. 3 is a fragment of the main part of the fuel cartridge 30 shown on a larger scale than in FIG. 2. FIG. 4 is a three-dimensional sectional view of the fuel connector 1 of the present embodiment. FIG. 5 is an exploded view of a part of the fuel connector 1 shown in FIG. 4. FIG. 6 is an enlarged view of a connection element 111 on the connection side of the fuel cell connector shown in FIG. 1. In the subsequent description, the side of fuel cell connector 1 of the present embodiment, which is to be connected to the cartridge 30, will be considered as the lower side (with reference to the image in the drawing).

As shown in FIG. 1, the fuel cell connector 1 of the present embodiment is installed in a mobile phone 100 that is shown as a device using a fuel cell and that incorporates a fuel cell, e.g., a direct methanol fuel cell (DMFC), which is not shown in the drawings. The connector 1 is intended for connection to and disconnection from the fuel cartridge 30, the interior of which is filled with the fuel to be supplied to the fuel cell. Let us first consider the fuel cartridge to be used in conjunction with the connector of the present embodiment.

As shown in FIG. 2, the fuel cartridge 30 has a substantially cylindrical container housing 31. The housing 31 has a double-layer structure and consists of an inner container 312, the interior of which forms a fuel storage chamber 311 filled with fuel F and divided by a piston 32, and an outer casing 313 that is open at the top and contains compressed gas G for displacing fuel F by means of the piston 32. A compressed gas chamber 314 is formed mainly between the outer surface of the inner container 312 and the inner surface of the outer casing 313. The volume ratio between the fuel storage chamber 311 and the compressed gas chamber 314 depends on the position of the piston 32, so that when the content of fuel F decreases and the piston 32 moves up, a part of the compression gas chamber 314 displaces into the inner container 312.

In accordance with the present embodiment, fuel F that is to be supplied to the DMFC comprises a mixture of methanol and pure water. However, the invention is not limited to the use of this mixture only, and the fuel may comprise, e.g., a mixture of pure water with ethanol or a similar alcohol of an appropriate concentration mixed with pure water, or the fuel may consist merely of an alcohol; therefore, various modifications are possible depending on the type of the fuel cell, etc.

In accordance with the present embodiment, it is recommended to use compressed gas G of the type that prevents mixing of fuel F with oxygen, which may unfavorably affect a reaction that occurs in the fuel cell and which may cause oxidation of fuel F. Therefore, it is preferable to use nitrogen, carbon dioxide, deoxygenated air, or a similar gas that does not contain oxygen. Furthermore, although the present embodiment is illustrated in connection with the use of compressed gas G, this should not be construed as limiting the scope of the invention, and a liquefied gas vapor, e.g., DME (dimethyl ether), can be used instead of compressed gas.

Attached to the outer casing 313 is a cartridge-side connection element 33 intended for connection to the upper end of the fuel cell connector which is described below. The aforementioned cartridge-side connection element 33 consists essentially of a connection housing 331 rigidly attached to the outer casing 313 and a cartridge-side valve 34 attached to the aforementioned connection housing 331.

The connection housing 331 is provided with a cylindrical flange 331a that has a central opening, a tubular connector body 331c that extends upward from the opening of the flange and has a connection opening 331b, and an insertion portion 331d that is directed downward from the lower side of the cylindrical flange 331a in the form of an annular extension which is inserted into the upper opening of the outer casing 313 and is fitted with its outer surface to the inner surface of the aforementioned opening.

As shown in FIG. 3, the tubular connector body 331c is provided with engagement projections 331c1, which project radially outward from the outer periphery of the tubular connector body 331c at its upper end and are uniformly and circumferentially spaced from each other. At its lower end, the tubular connector body 331c is provided with pressure elements 331c3 projecting radially outward from the outer periphery of the tubular connector body 331c and with spline-shaft like projections 331c2 that are shifted toward the engagement projections 331c. All three elements, i.e., engagement projections 331c1, projections 331c2, and pressure elements 331c3, form a cartridge-side engagement portion S2. Furthermore, the tubular connector body 331c is provided with a reference projection 331c4 (FIG. 2), which is formed in one place at the upper end of the tubular connector body 331c, extends downward and inward from the inner periphery of the aforementioned connection body, and is intended for use as a reference for noting an absolute position, and with several selective projections (two in the present embodiment) 331c5 and 331c6 which are formed at the upper end on the inner periphery of the tubular connector body 331c extending downward and which are located with respect to the reference projection 331c4 in positions that depend on the type of the fuel cartridge 30. In the illustrated embodiment, the reference projection 331c4 is wider than the selective projections 331c5 and 331c6. Depending on the type of the fuel cartridge 30 used for the fuel cell, the selective projections 331c5 and 331c6 may have different widths and lengths. Altogether, the reference projection 331c4, selective projection 331c5, and selective projection 331c6 form a cartridge engagement key K2. Furthermore, the device is provided with a cartridge-side valve 34 (which is described later in more detail) that is inserted into the connection opening 331b, has an opening 34a at its upper end for the supply of fuel F, and can be opened or closed.

The inner container 312 comprises a substantially cylindrical body, the lower end of which is not in contact with the bottom of the outer body 313. At its lower end, the inner container 312 has a plurality of longitudinal slots 312a formed on its peripheral surface, and when the piston 32 is shifted down, the interior of the inner container 312 can communicate with the interior of the outer casing 313. As shown in FIGS. 2 and 3, a tubular part 312c that is formed in the center of the upper wall of the inner container 312 extends upward and has a through-opening 312b that communicates with the cartridge-side valve 34. The tubular part 312c is surrounded with the outer tubular element 312d which also extends in the upward direction and is spaced therefrom for a predetermined distance. The lower end of a housing 341, which is described later, is telescopically inserted into the space between the tubular part 312c and the outer tubular element 312d.

The cartridge-side valve 34 consists essentially of a housing 341, a stem 342 which is moveable in the vertical direction of the device having the orientation shown in FIG. 3, a spring 343 that normally urges the stem 342 in the closing (upward) direction, a valve body 344 (O-ring) for closing and opening the fuel passage channel for fuel F, and a connection O-ring 345 (sealing element). The upper end face of the cartridge-side valve 34 has a fuel-supply opening 34a for the supply of fuel F.

The housing 341 has a substantially cylindrical shape and a flange 341a that projects radially outward from the periphery of the housing 341 and is formed in a predetermined position shifted down from the intermediate part of the housing. An O-ring seal 341b, which is inserted into the groove formed in the outer periphery of the housing at a certain position below the flange 341a, is sealingly fitted against the upper end of the aforementioned inner container 312. The upper surface of the flange 341a contacts the lower surface of the cylindrical flange 331a. The housing 341 is also provided with an O-ring seal 341c, which is fitted into the outer periphery at the upper end of the housing above the flange 341a and which is maintained in a sealing engagement with the wall of the aforementioned connection opening 331b. The housing 341 has another connection O-ring 345 positioned on the outer periphery of the housing at the upper end thereof and intended for use in conjunction with the fuel-cell connector 1 which is described later. The aforementioned opening 34a that is formed at the upper end of the housing 341 and extends downward to a predetermined length has a smaller diameter in its upper portion than in the lower portion.

The stem 342 has a rod-like shape and consists of an intermediate shoulder 342a of an increased diameter that extends radially outward, an upper portion 342b, and a lower portion 342c. In the housing 341, the stem 342 is moveable in the axial direction and is urged in the valve-closing direction by the aforementioned spring 343, which is located between the lower end face of the shoulder 342a and the upper end face of the tubular part 312c. The upper portion 342b of the stem 342 supports the aforementioned valve body 344 (O-ring), which is fitted onto the outer periphery of the upper portion near its base, is inserted into the fuel supply opening 34a located above the valve body 344, and normally closes the fuel supply opening and shuts off the flow of fuel F by being pressed against the stepped surfaces of the housing 341 and the fuel supply opening 34a. When downward-directed pressure is applied to the stem 342, the spring 343 is compressed, the stem 342 moves down, and the valve-body 344 moves away from the aforementioned stepped surfaces, whereby the fuel-supply opening 34a opens, and the flow of fuel F contained in the fuel-storage chamber 311 flows out and through the fuel-supply opening 34a.

The piston 32 is provided with a resilient sealing member 32a, which is inserted into a groove formed on the outer periphery of the piston 32 so that the piston functions as a moveable partition that divides the inner container 312 into the fuel-storage chamber 311, which is located above the piston, and the compressed gas chamber 314, which is located below the piston, and under the pressure of compressed gas G acting onto the lower end-face of the piston, the latter applies pressure to the fuel F located in the chamber above the piston; when the stem 342 shifts to the open position, the fuel is forced out from the fuel-storage chamber 311.

The following explanation relates to the process of injecting compressed gas G to the compressed gas chamber 314 and to the process of injecting fuel F to the fuel-storage chamber. Injection of compressed gas G into the compression gas chamber is carried out prior to injection of fuel F to the fuel-storage chamber. First, the gas-injection opening of a compressed gas-filling device (not shown in the drawings) is fitted onto the cartridge-side valve 34, and under the effect of applied pressure, the stem 342 moves to the open position so that compressed gas can be injected into the fuel-storage chamber 311 through the valve 34. As a result, the piston 32 moves down toward the bottom of the outer casing 313. When the piston 32 reaches its lowest position, the upper edge of the longitudinal slot 312a finds itself at a higher level than the upper side of the resilient sealing member 32a so that compressed gas G can flow from the fuel-storage chamber 311 to the compressed gas chamber 314. When pressure in the compression chamber 314 reaches a predetermined level, injection of compressed gas G discontinues.

Following this, the stem 342 is moved to the open position for the second time, allowing excess compressed gas to flow out from the fuel-storage chamber 311. As a result, the piston 32 moves up, and the fuel-supply chamber 311 returns to its sealed state. When excess compressed gas is discharged under the pressure developed by the compressed gas G in the compressed gas chamber 314 beneath the piston 32, the latter moves to the upper end of the inner container. After excess gas leaves the fuel-storage chamber 311, compressed gas G remaining in the fuel-storage chamber 311 and in the compressed gas chamber 314 is sealed. The fuel cartridge is constructed so that when the fuel injection device (not shown in the drawings) is connected to the cartridge-side valve 34 after the above-described process, the piston 32 shifts down under the effect of the fuel F which is injected into the fuel-storage chamber 311 to a predetermined volume.

In the present embodiment of the invention, the fuel cartridge 30 has a double-layered structure, but this structure should not be construed as limiting the method of connection to the fuel-cell connector 1 of the present invention, and various modifications are possible. For example, the container may have a single-layered structure, and the fuel F can be injected into the inner part of the container, along with LPG (liquefied petroleum gas), DME (dimethyl ether), CFC (chlorofluorocarbon), or a similar evaporated liquefied gas or carbon dioxide, nitrogen, or a similar compressed gas so that under pressure developed by aforementioned liquefied or compressed gas, the fuel F can be expelled from the container in the form of fog, or droplets. Alternatively, the container may be flexible and equipped with the cartridge-side connection element in the form that can be connected to the fuel-cell connector 1. However, it is preferable to have a container that can be recycled and refilled.

The following describes the fuel-cell connector 1 of the present embodiment. As shown in FIG. 4, the fuel-cell connector 1 essentially consists of the following components: a connector body unit 10 that comprises a fuel-receiving opening 10a located at its lower end and intended to receive fuel F from the above-described fuel cartridge 30, a fuel-discharge opening 10b provided at the upper end thereof for discharging fuel F to the fuel cell, which is not shown in the drawings, and a channel that is formed inside the connector body unit and extends from the fuel-receiving opening 10a to the fuel-discharge opening 10b; a spring element 15 (resilient member) that resists movement of the connector body unit 10 in the insertion direction of the fuel-cartridge 30; and a stationary mechanism part 20 for attachment to a mobile phone, wherein this stationary part surrounds the connector body unit 10 and has a connector-side engagement means S1 for connection and fixation of the fuel cartridge 30 to a mobile phone 100.

The connector body unit 10 consists of a connector body 11 that has the aforementioned fuel-receiving opening 10a at its lower end, a connector-side valve 12 capable of closing or opening the fuel-receiving opening 10a, and a fuel-discharge nozzle 13 located at the upper end of the connector body unit 10.

Figure 12:
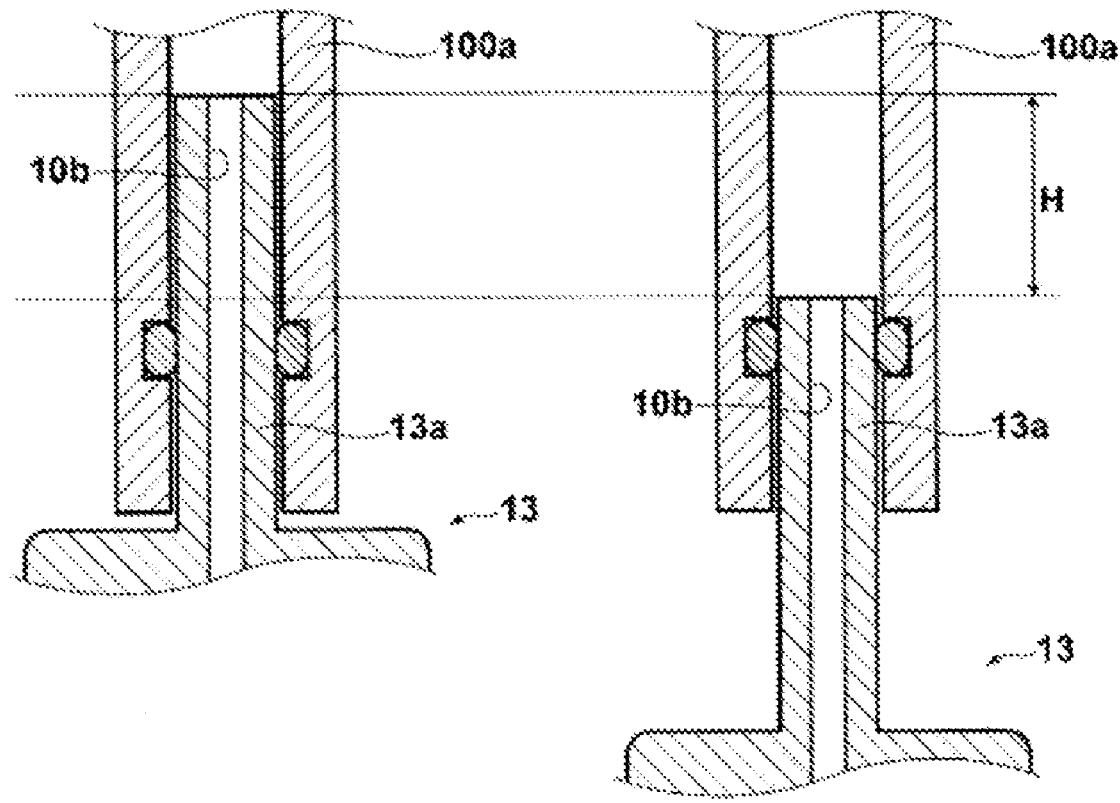
FIG. 12 is a sectional view used to explain movement of the nozzle tip.

The connector body 11 has a circular fuel-receiving wall 110, which is provided with a fuel-receiving opening 10a in the center. The fuel-receiving opening 10a is intended to fit onto the lower end 120c of a plug 120, which is described later. Located below the fuel-receiving wall 110 is a cylindrical connector-side connection element 111 that projects downward and surrounds the aforementioned lower end 120c of the plug 120. The upper surface of the fuel-receiving wall 110 is provided with an upwardly directed [inner] cylindrical portion 112 and an outer cylindrical portion 114 with an annular groove 113 formed between the outer periphery of the inner cylindrical portion 112 and the inner periphery of the outer cylindrical portion 114. A spring member 14 is placed into the aforementioned annular groove 113. A holder engagement projection 115 projects outward from the upper end of the outer cylindrical portion 114. The opening formed on the upper end of the inner cylindrical portion 112 is sealed with the nozzle 13, which has the aforementioned fuel-discharge opening 10b that communicates with the inner cylindrical portion 112. As will be described later with reference to FIG. 12, the upper end 13a of the nozzle 13 is inserted into a fuel-inlet opening 100a for the supply of fuel F, and when the connector 11 is moved, the inner surface of the fuel-inlet opening 100a slides over the nozzle 13. The lower end 13b of the nozzle 13 is attached to the inner surface of the inner cylindrical portion 112, e.g., by thread.

The connector-side connection element 111 has connection engagement keys K1. As shown in FIG. 6, the aforementioned engagement keys K1 are formed on the outer surface of the connector-side connection element 111 in the form of a connector-side reference groove 111a for engagement with the aforementioned reference projection 331c4 of the cartridge-side engagement key K2 and connector-side selective grooves 111b and 116c for engagement with the aforementioned selective projections 331c5 and 331c6. In the present construction, the connector-side reference groove 111a is wider than the connector-side selective grooves 111b and 116c. In the illustrated embodiment, connection engagement keys K1 and K2 of the fuel-cell connector 1 and the fuel cartridge 30 have a specific construction as described above. It is understood, however, that the invention is not limited only to this construction. For example, various appropriate design modifications are possible by making several reference grooves 111a and several reference projections 331c4. The reference groove 111a, reference projection 331c4, selective grooves 111b and 111c, and selective projections 331c5 and 331c6 can be formed on the inner peripheral surface, on the inner and outer peripheral surfaces, or in several combined patterns. Moreover, the construction of engagement means is not limited to projections and grooves and can be made in the form of tubes and openings.

The interior of the cylindrical portion 112 and the connection element 111 contains the connection-side valve 12. This valve consists of the following components: a plug 120 that has a circular flange 120a formed in the middle of its vertical length; an upper portion 120b that projects upward from the flange 120a and a tapered lower portion 120c that extends downward from the flange 120a; a connector-side spring 121 which is fitted onto the outer periphery of upper portion 120b between the upper end face of the flange 120a and the lower end of the nozzle 13; and a connector-side O-ring 122. The flange 120a of the plug 120 is urged in the valve-closing direction under the effect of a connector-side spring 121, which compresses the connector-side O-ring 122 between the lower surface of the flange 120a and the upper surface of the fuel-receiving wall 110. When the fuel cartridge 30 is not connected, the connector-side O-ring 122, the compression force of the connector-side spring 121 maintains the O-ring 122 in tight contact with the fuel-receiving wall 110 and the flange 120a. This prevents fuel F that fills the channel of the connector body 11 from leakage through the space between the lower portion 120c and the fuel-receiving opening 10a.

As shown in FIG. 4, the stationary mechanism part 20 has a substantially tubular configuration and can be rigidly connected to a fuel cell device, which is not shown in the drawings, while at its lower end the stationary mechanism part 20 is removably connectable to the tubular connector body 331c of the cartridge-side connection element 33.

The stationary mechanism part 20 comprises a holder body 21 which can be attached to the mobile phone 100, a ratchet holder 22 rigidly connected to the aforementioned holder body 21, and three rings that are sequentially arranged in the upward direction from the lower end of the stationary mechanism part 20 and that form connection-side engagement means S1, i.e., a first ring 23 (a slide ring), a second ring 24 (a lock ring), and a third ring 25 (guide ring). The aforementioned connection-side engagement means S1 and the aforementioned engagement means S2 on the side of the cartridge 30 are connected and fixed with the use of the ratchet mechanism S, thus forming a connection of the fuel cartridge 30 that can be connected to or disconnected from the fuel-cell connector 1.

The holder 21 (shown in the upper part of FIG. 5) has a substantially cylindrical body 211, four equally spaced flange elements 214 projecting radially outward from the upper part of the cylindrical body 211, threaded openings 215 which are formed in the middle and on the upper surface of each flange element for attachment of the holder, and four equally spaced engagement teeth 216 that project radially outward from the periphery of the cylindrical body 211 in spaces formed between the flange elements 214. The holder 21 is attached to the inner part of the mobile phone 100 by means of screws insertable into the aforementioned threaded openings 215. Furthermore, the holder body 211 has recesses 211a positioned above three engagement teeth 216 and one displacement groove 211b that is formed on the inner periphery, does not have a recess 211a, and extends from the upper end face to the lower end face [of the holder body]. As described later, the engagement teeth 216 can be inserted into engagement recesses 222 of the ratchet holder during assembly.

The ratchet holder 22 (shown in the lower part of FIG. 5) comprises a cylindrical body 220. The cylindrical body 220 has the following elements formed on its inner surface: four first guide grooves 221 which extend in the vertical direction from the upper end face of the cylindrical body approximately to the middle of its height; the aforementioned engagement recesses 222 formed in the middle of the guide grooves 221 and extending in the vertical direction; a plurality (12 in the illustrated embodiment) of equally spaced ratchet teeth 223 that extend in the axial direction and are formed on the inner periphery of the cylindrical body closer to the lower end face thereof; and a plurality (12 in the illustrated case) of equally spaced second guide grooves 224 which are formed below and between the ratchet teeth 223 and allow attachment of the ratchet holder 22 to the holder 21 through engagement with the teeth 216 of the holder body 21, as described below. Furthermore, the upper sides of the ratchet teeth 223 are made as engagement steps 223b and tapered surfaces 223a that are tapered upward in the clockwise direction, as shown in the drawing. The engagement steps 223b have similar tapered surfaces on their upper sides.

The first ring 23 (slide ring) is provided with twelve equally space guide projections 232 formed on the outer periphery of the ring body 231 and with respective projection 233 located at the same level as the guide projections 232 and formed on the inner periphery of the ring body 231. The upper and lower surfaces of these projections are coplanar with the end faces of the ring body. In a normal state, the guide projections 232 that are formed on the outer periphery are inserted into the second guide grooves 224 of the ratchet holder 22 so that they prevent rotation of the first ring 23 but allow its vertical movement. Furthermore, when the pressure elements 331c3 projecting from the tubular connector body 331c of the cartridge-side connection element 33 are in the upper position, they contact the lower surface of the inner-periphery projections 233 and, under the effect of applied pressure, shift the first ring 23 upward in the axial direction. The engagement projections 331c1 of the tubular connector body 331c can be inserted into the longitudinal grooves formed between the inner-periphery projections 233.

The second ring 24 (lock ring) is provided with twelve equally spaced guide projections 242 projecting radially outward from the outer periphery of the ring body 241, a plurality of equally spaced slide teeth 243 formed on the upper end face of the ring and having tapered upper surfaces that taper downward in the clockwise direction, and equally spaced locking projections 244 formed on the inner periphery of the ring, as shown in the drawing. In operation, the second ring 24 can rotate in the counterclockwise direction (if one looks at the drawing). The guide projections 242 and the locking projection 244 are located in the lower part of the ring body 241 in the same circumferential positions and have inclined surfaces 242a and 244a which are higher in the forward direction of arrow "d" and lower in the reverse direction of arrow "d". In a similar manner, the upper sides of the slide teeth 243 have tapered surfaces 243a which are higher in the forward direction and lower in the reverse direction of arrow "d".

When the peripheral guide projections 242 are inserted into the second guide grooves 224 of the ratchet holder 22 by guiding the second ring 24 in the axial direction, and when the amount of movement of the second ring 24 in the upward direction is significant, the guide projections 242 project from the second guide grooves 224, and the second ring 24 can be turned. When under the effect of the above rotation the inclined surfaces 242a on the lower side of the guide projections 242 descend while contacting the respective tapered surfaces 223a on the ratchet teeth 223 or with the upper inclined surfaces of the engagement steps 223b, contact between the inclined mating surfaces cause further rotation, and this creates either locking conditions with engagement of the tips of the guide projections 242 with the engagement steps 223b or disengagement conditions in which the guide projections 242 are inserted into the second grooves 224 so that rotation is stopped. Furthermore, when the cartridge-side connection element 33 is inserted and moved in the downward direction, the locking projections 244 formed on the inner periphery of the ring also rotate and are shifted to the inner sides of the locking engagement projections 331c1 of the tubular connector body 331c, thus providing locking engagement.

The third ring 25 (guide ring) has a ring body 251 with four equally spaced guide projections 252 that project radially outward from the outer peripheral surface of the ring body and ratchet teeth 253 with inclined surfaces on the lower end face of the ring. Normally, the guide projections 252 are inserted into the first guide grooves 221 of the ratchet holder 22, so that the third ring is prevented from rotation but allowed to move vertically. A downward movement of the third ring 25 causes engagement of the lower surfaces of the guide grooves 221 with the projections 252 whereby further movement is limited, and the second ring 24 is disengaged.

Figure 7:
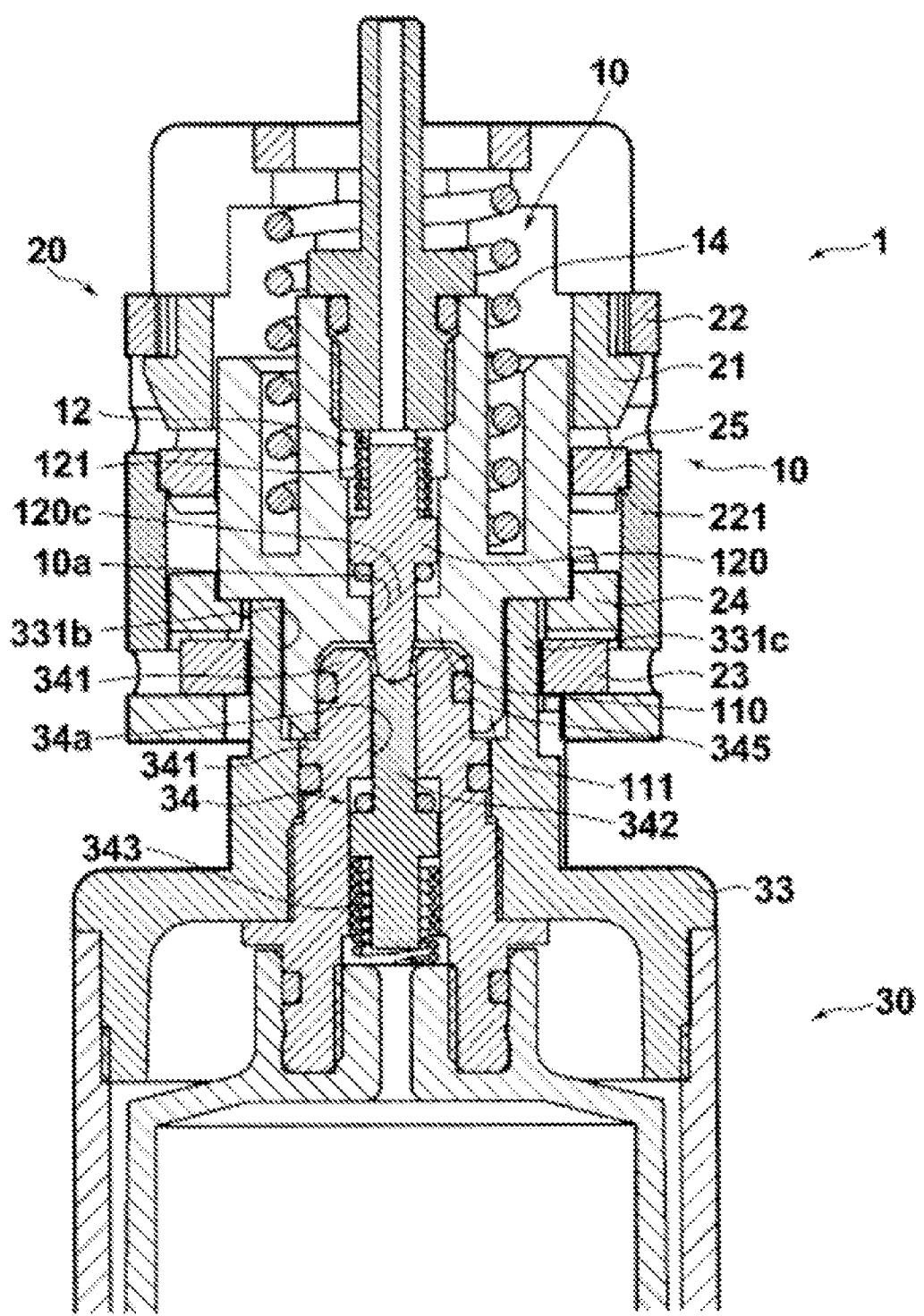
FIG. 7 is a longitudinal sectional view that shows the fuel-cell connector 1 and the fuel cartridge brought into a connected state after the first insertion movement.
Figure 8:
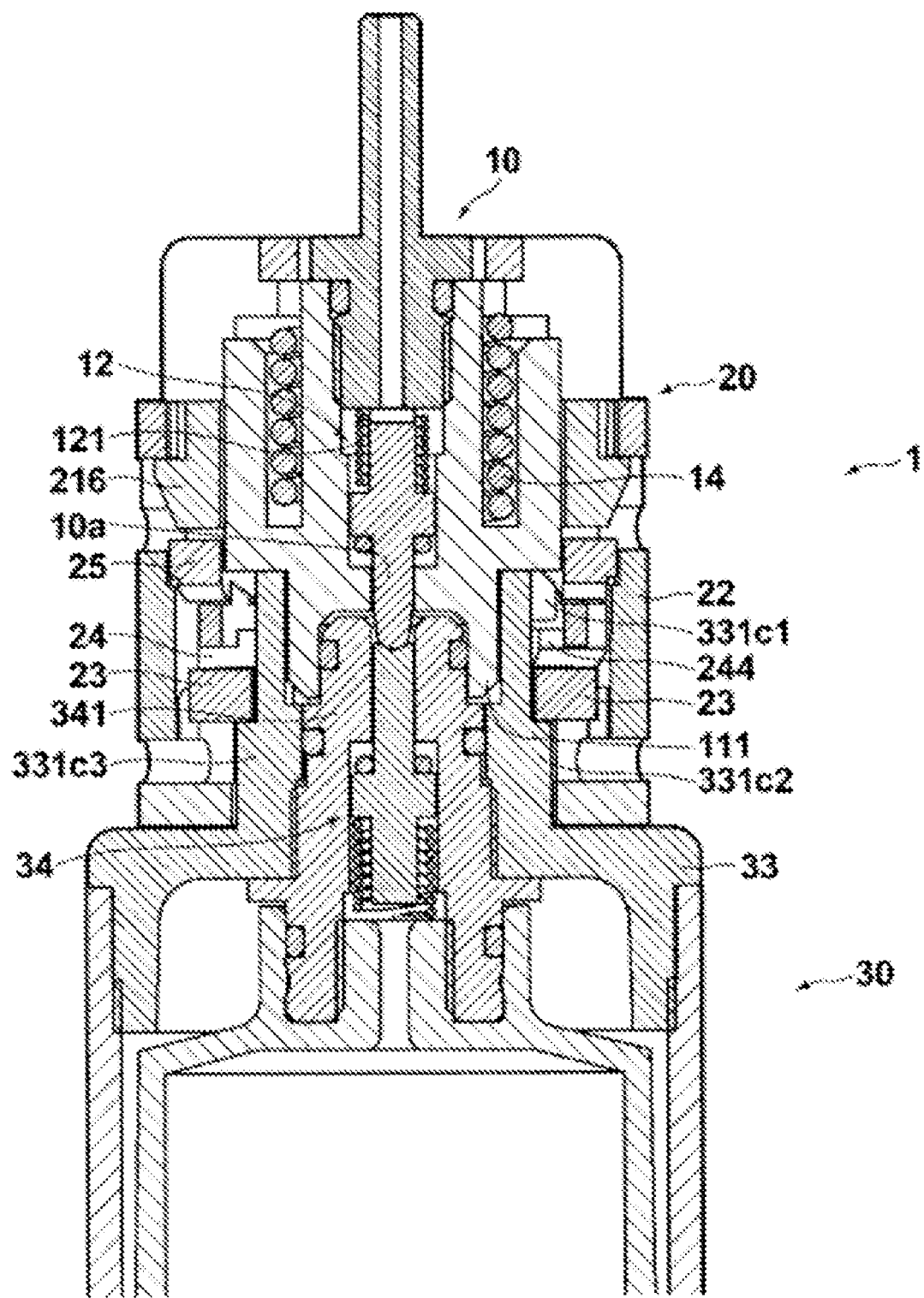
FIG. 8 is a longitudinal sectional view that illustrates the connection state achieved after the second stage of insertion when the fuel cartridge is inserted into the fuel cell connector to the maximum depth of insertion.
Figure 9:
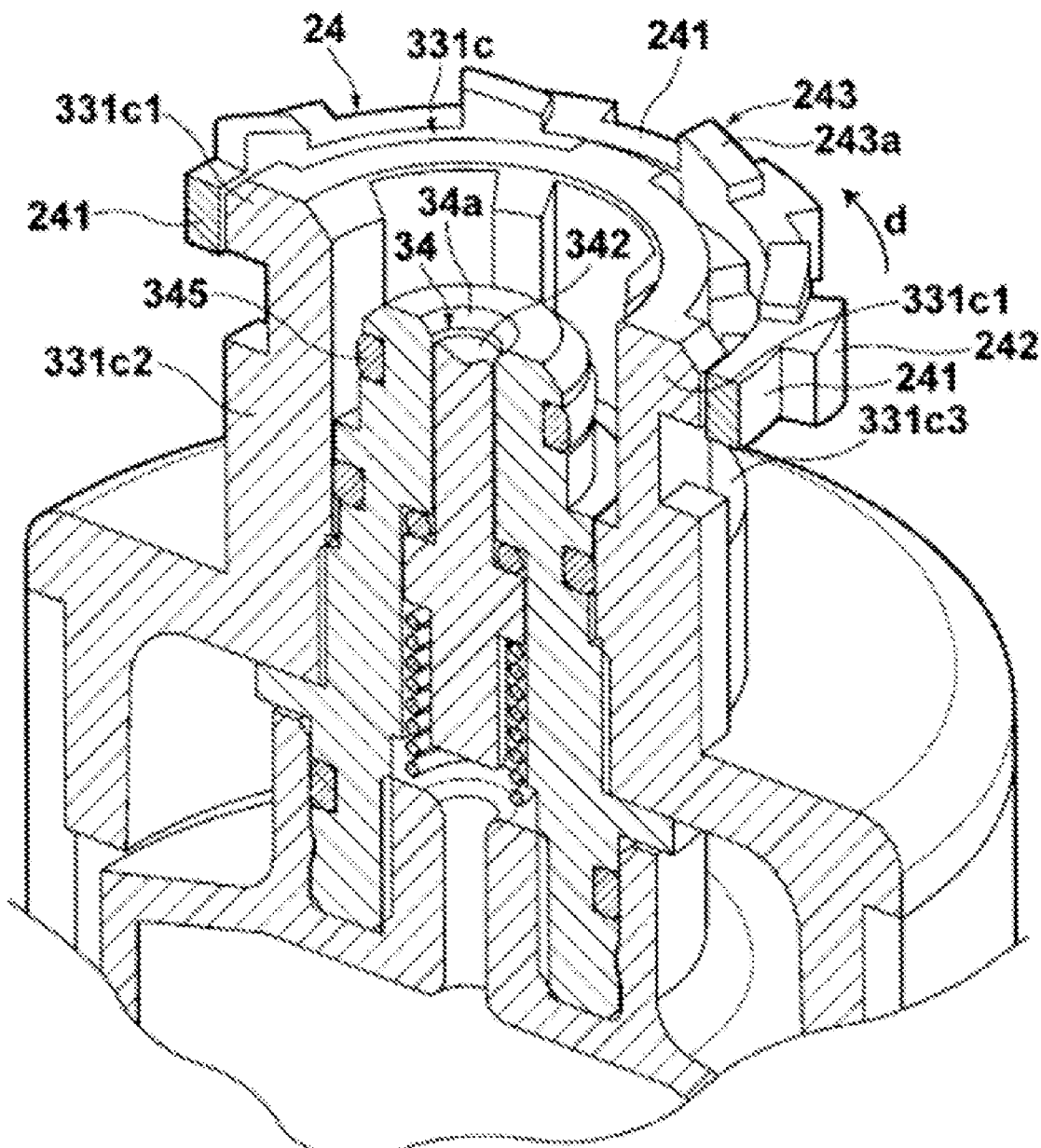
FIG. 9 is a three-dimensional sectional view that shows engagement of the cartridge-side connection element in the unlocked condition with the second ring.
Figure 10:
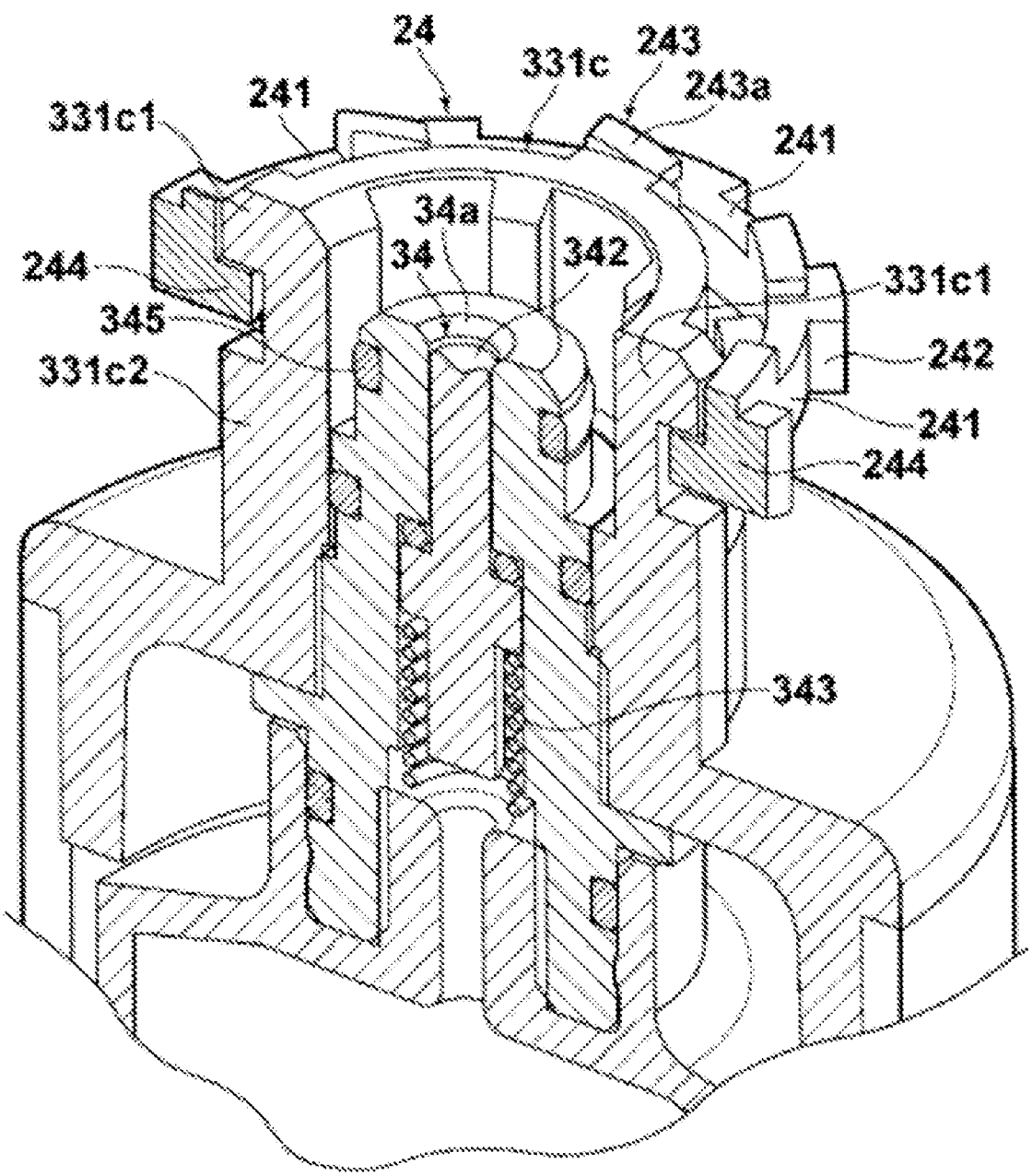
FIG. 10 is a three-dimensional sectional view that shows relative positions of the cartridge-side connection element and the second ring shifted from the positions shown in FIG. 9 to the locked condition.
Figure 11:
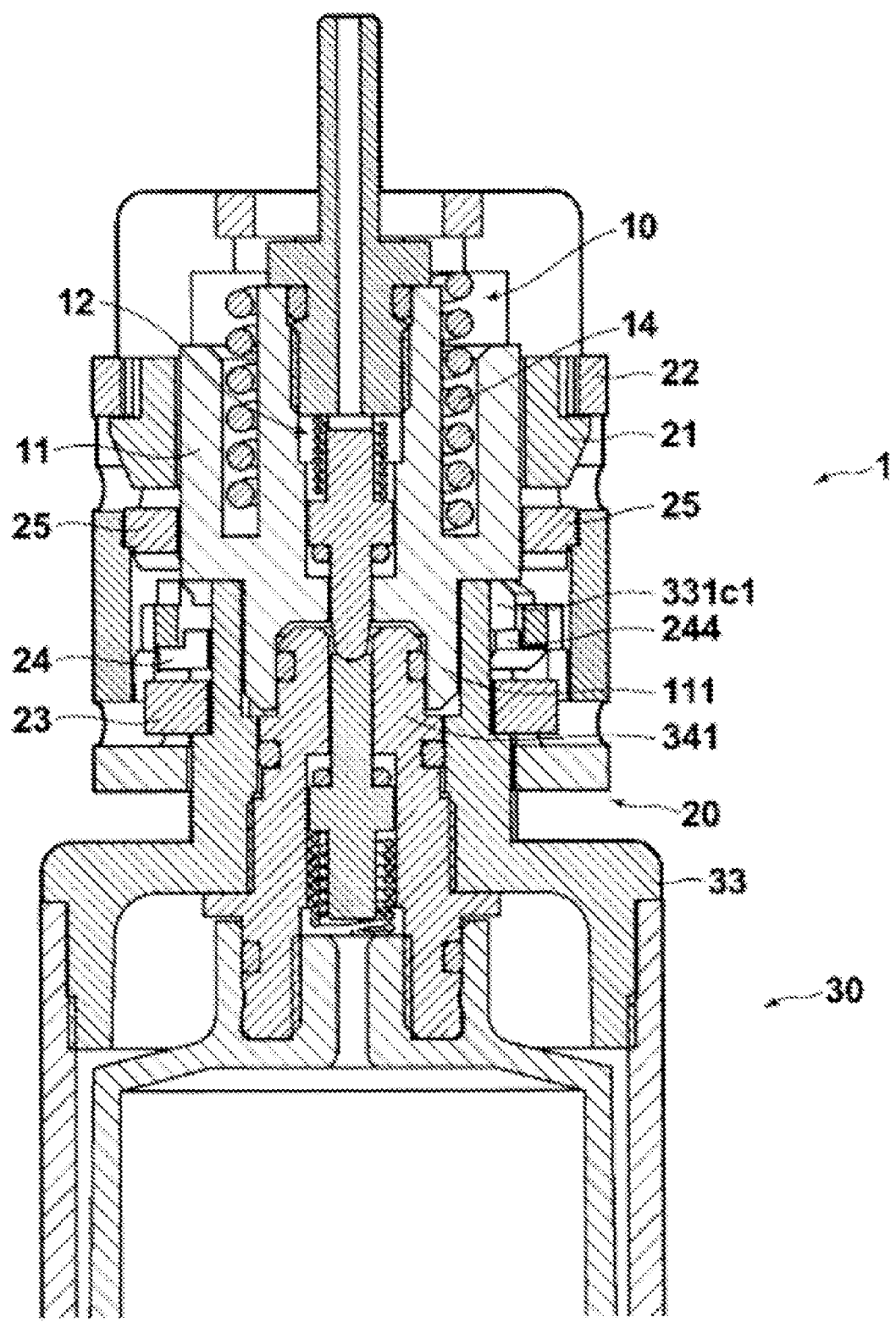
FIG. 11 is a sectional view that shows the fuel-cell connector and the fuel cartridge in a locked condition.

The following describes operational connection of the aforementioned fuel cartridge 30 to the fuel cell connector 1 made in accordance with the construction of the present embodiment. FIG. 7 is a longitudinal sectional view that shows the fuel-cell connector 1 and the fuel cartridge 30 brought into a connected state after the first insertion movement. FIG. 8 is a longitudinal sectional view that illustrates the connection state achieved after the second stage of insertion when the fuel cartridge 30 is inserted into the fuel cell connector to the maximum depth of insertion. FIG. 9 is a three-dimensional sectional view that shows engagement of the cartridge-side connection element 33 in the unlocked condition with the second ring. FIG. 10 is a three-dimensional sectional view that shows relative positions of the cartridge-side connection element 33 and the second ring shifted from the positions shown in FIG. 9 to the locked condition, and FIG. 11 is a sectional view that illustrates the fuel-cell connector 1 and the fuel cartridge in a locked state.

In the disengaged state of the cartridge-side connection element 33 when it is disconnected from the fuel cell connector 1, the lower end face of the outer cylindrical portion 114 of the connector body 11 is pressed against the locking projections 244 of the second ring 24 (FIG. 4), whereby the connector body unit 10 does not comes out from the inner part of the stationary mechanism part 20. Furthermore, the guide projections 232 and 242 of the first ring 23 and the second ring 24, respectively, are positioned in the second guide grooves 224 of the ratchet holder 22, preventing the second ring 24 from rotation, while the guide projections 252 of the third ring 25 engage the lower ends of the first guides 221 (FIG. 4), thus restricting the third ring 25 in the lower position.

First, as shown in FIG. 7, when the cartridge-side connection element 33 of the fuel cartridge 30 is connected to the fuel cell connector 1, the outer surface of the connector-side connection element 111 is inserted into the connection opening 331b, while the connector-side reference groove 111a, the connector-side selective groove 111b, and the connector-side selective groove 111c, i.e., the connector-side engagement key K1, and the reference projection 331c4, selective projection 331c5, and the selective projection 331c6 located on the side of the cartridge connection element 33, i.e., the cartridge-side key K2, are engaged with each other. After the connection O-ring 345 of the cartridge-side connection element 33 is pressed into a sealed state against the inner surface of the connector-side connection element 111 of the connector body unit 10, the upper end face of the stem 342 pushes on the tip of the lower part 120c of the plug 120, whereby the connector spring 121 is compressed, connector-side valve 12 moves to the open position, and the fuel-receiving opening 10a is opened.

After the connector-side valve 12 is opened, the upper end face of the stem 342 pushes on the tip of the lower part 120c, the spring 343 is compressed, and the cartridge-side valve 34 is opened, thus opening the fuel-supply opening 34a. Since the connector-side valve opens ahead of the cartridge-side valve 34 and by the time fuel F fills the interior of the fuel cartridge 30 and discharges through the fuel-supply opinion 34a, the fuel-receiving opening 10a has already opened. This prevents leakage of fuel F in the vicinity of the fuel-receiving opening 10a and makes it possible to supply fuel in a smooth manner. As a result of the actions described above, fuel F stored in the fuel cartridge 30 is supplied to the fuel cell (not shown) through the fuel-cell connector 1.

In the above-described connection operation, only the fuel cartridge 30 that has engagement key K2 that corresponds to the connection engagement key K1 of the connector 1 can be connected to the latter. Therefore, if the user unintentionally tries to connect the cartridge having the cartridge-side key K2 that does match the connector-side key K1, the keys will not engage, and therefore it will be impossible to connect a fuel cartridge 30 that does not correspond to the fuel cell of the mobile phone 100. This prevents connection of a wrong fuel cartridge. What has been described heretofore is the first insertion step that results in approaching and connecting the fuel-receiving opening 10a to the fuel-supply opening 34a. In other words, the upper end of the housing 341 is telescopically inserted into the connection element 111 on the connection side so that a small gap (play) remains between the lower end-face of the fuel-receiving wall 110 and the tip of the housing 341.

A specific feature of the present invention is that the above-described first step of insertion of the cartridge-side connection element 33 into the fuel-cell connector 1 is followed by the second insertion step by which the connector body unit 10 is [telescopically] shifted to integral connection with the cartridge-side connection element 33 in which the fuel-receiving opening 10a to the fuel-supply opening 34a are maintained in a closely approached position (FIG. 7). At the same time, engagement between the cartridge-side engagement portion S2 and the connector-side engagement means S1 provides rigid connection of the fuel cartridge 30 to the stationary mechanism part 20. The second insertion step operation is described below.

In the state of close approach of the fuel-receiving opening 10a to the fuel-supply opening 34a, which is achieved by the second insertion step after the first insertion step, the upper end face of the tubular connector body 331c presses on the lower surface of the fuel-receiving wall 110 and compresses the spring member 14, whereby the holder engagement projection 115 is guided in the displacement groove 211b (FIG. 4), and the connector 10 moves up (toward the fuel cell) together with the fuel cartridge 30 and assumes the uppermost position shown in FIG. 8. In this position, the spring member 14 is compressed in the direction that resists the insertion of the connector body unit 11.

Movement of the fuel cartridge 30 and the connector body unit 10 in the aforementioned second insertion step is accompanied by the upward movement of the engagement projections 331c1 of the tubular connector body 331c along the longitudinal grooves formed in the first and second rings 23 and 24. As a result, as shown in FIG. 8, the pressure elements 331c3 come in contact with the lower side of the first ring 23 and push it upward. The second ring 24 also is raised and comes into contact with the lower side of the third ring 25 (FIG. 7) that is stopped by the lower end of the first guide grooves 221. In this operation, the guide projections 242 of the second ring 24 project beyond the limits of the upper end face of the second guide grooves 224 of the ratchet holder 22 and can be rotated (FIG. 9) due to engagement with the tapered surfaces of the ratchet teeth 253 on the lower side of the third ring 25. The rotation occurs in the direction "d" shown in FIG. 5. In the state shown in FIG. 9, the upward movement of the third ring 25 is limited, and due to contact of the second ring 24 with the tapered surfaces of the third ring 25, the parts located above the first ring 23 are turned. As shown in FIG. 10, rotation of the second ring 24 displaces its locking projections 244 toward engagement with the below-located locking projections 331c1 of the tubular connector body 331c, whereby the second ring 24 is locked against further projection.

Next, when the aforementioned insertion operation is released from the maximum insertion state, the cartridge-side connection element 33 is urged back by means of the connector body 11 under the force of the compressed spring member 14 and is moved down (in the direction of separation of the fuel cartridge 30) integrally with the connector body unit 10. This movement is accompanied by engagement and downward movement of the locking projections 244 of the second ring 24 with the engagement projections 331c1 of the tubular connector body 331c of the cartridge-side connection element 33, whereby the third ring 25 and the first ring 23 are also shifted down as a single unit. As a result, when the third ring 25 is shifted down and stopped by the lower end face of the first guide grooves 221, the second ring 24 is separated therefrom and can move further down, whereby both tapered surfaces are released from mutual contact, and under the effect of the aforementioned rotary motion, the guide projections 242 on the lower side of the second ring 24 move from the position in the second guide grooves 224 and slide over the tapered surfaces of the ratchet teeth 223. While the second ring 24 is moved further down, the movement along the aforementioned tapered surfaces causes this ring to rotate. When this rotation movement is stopped because of contact of the guide projections 242 of the second ring 24 with the engagement steps 223b, the second ring 24 is prevented from further movement in the downward direction, the cartridge-side connection element 33 which is engaged with the locking projections 244 of the second ring 24 is locked, and the locking condition which is shown in FIG. 11 and in which the connected parts are prevented from separation is achieved.

Release from the above-described locking condition is carried out by pushing down on the cartridge-side connection element 33 for the second time, whereby the connector body unit 10 and the fuel cartridge 30 move up (i.e., in the fuel-cell direction) as a single unit. The aforementioned movement is accompanied by an upward movement of the first ring 23 and the second ring 24. The lower end of the second ring 24 is separated from the engagement steps 223b and turns. The tapered surfaces of the ratchet teeth 253 of the third ring 25 cause rotation of the second ring 24, and along with subsequent retraction of the cartridge-side connection element 33, the tapered surfaces of the guide projections 242 of the second ring 24 pass from the engagement steps 223b of the ratchet teeth 223 to the position of contact with the tapered surfaces that reach the second guide groove 224. Contact with these tapered surfaces causes further rotation of the second ring 24 in direction "d", and the guide projections 242 are turned to the position of entering the second guide groove 224. As shown in FIG. 8, in the aforementioned turned position of the second ring 24, the engagement projections 331c1 are released from the locking projections 244, are aligned with the position of the longitudinal grooves, and are released from the locking engagement, whereby the tubular connector body 331c can be moved in the separation direction, is shifted in this direction by the force of the compressed spring member 14, and is pushed out. At the same time, connector-side valve 12 is closed later than the cartridge-side valve 34. Since in the above-described cartridge separation process the fuel-supply opening 34a is closed first, leakage of fuel from the fuel cartridge 30 is prevented.

Thus, in the above-described condition of maintaining the fuel-supply opening 34a and the fuel-receiving opening 10a in close proximity to each other, the connector body unit 10 moves integrally with the cartridge connection element 33, and it is possible either to engage the connection-side engagement means S1 with the cartridge-side engagement means S2 and to connect and fix the fuel cartridge 30 or to release the engagement means from the aforementioned engagement and to disconnect the fuel cartridge 30. Therefore, by maintaining the fuel-receiving opening 10a and the fuel-supply opening 34a in close proximity to each other, it becomes possible to essentially eliminate a gap between the fuel-receiving opening 10a and the fuel-supply opening 34a into which fuel F can penetrate. Furthermore, since the cartridge-side engagement means S2 can be connected to the connection-side engagement means S1 and the fuel cartridge 30 can be connected and fixed while the parts are maintained in the above-mentioned condition of close proximity, there is practically no gap into which fuel F can penetrate during disengagement and disconnection of the fuel cartridge 30. In other words, the construction creates conditions that make it difficult for fuel to penetrate into the gap between the fuel-receiving opening 10a and the fuel-supply opening 34a, and this makes it possible to reduce leakage of fuel F to the outside.

When all of the fuel F contained in the fuel cartridge is spent and the fuel cartridge 30 is to be disconnected from the fuel-cell connector 1 and in order to transfer the device from the condition of maximum insertion shown in FIG. 8 to the position of the first insertion step shown in FIG. 7, the connector body unit 10 is moved down while the fuel-receiving opening 10a and the fuel-supply opening 34a are maintained in close proximity. The above movement is accompanied by sliding the tip of the nozzle 13 (FIG. 12), which has the fuel-discharge opening, along the inner walls of the tubular part with the fuel-inlet opening 100a that guides fuel to the fuel cell (not shown in the drawings) and through the O-ring installed in the groove inside the opening 100a. Therefore, the volume inside the fuel-inlet opening 100a increases only by the volume of the section that corresponds to the displacement H of the nozzle 13. In other words, since spatial volume is increased during flow of fuel from the fuel-receiving opening 10a to the fuel-inlet opening 100a after passing from the fuel-receiving opening 10a to the fuel-cell side, pressure in the fuel passage acquires a negative value. For this reason, even if an insignificant amount of fuel F is present in the gaps on the fuel-cartridge side 30, the negative pressure will suck this fuel into the interior of the fuel-cell connector 1. Such a condition makes it possible to reduce residual fuel in the aforementioned gaps and to prevent leakage of fuel even when the fuel cartridge 30 is separated from the fuel-cell connector 1.

Thus, it has been shown that the connector body unit 10 and the cartridge-side connector 33, i.e., the fuel-cell connector 1 and the fuel cartridge 30, can be fixed together with the possibility of free connection and disconnection.

In the above embodiment, the fuel cartridge 30 is connected and fixed to the fuel-cell connector 1 by means of a ratchet mechanism S. However, the invention is not limited to the use of such a mechanism only, and any other mechanisms can be used to allow the fuel cartridge 30 to be maintained in the aforementioned inserted state and to easily separate from the fuel-cell connector. The spring member may be a compression spring or a leaf spring (not shown) that merely applies a resilient force for urging the fuel cartridge 30 to the fuel-cell connector 1.

While the foregoing describes the present invention in relation to illustrations and examples, it is understood that it is not intended to limit the scope of the invention to the illustrations and examples described herein. On the contrary, it is intended to cover all alternative modifications and equivalents that may be included in the spirit and the scope of the invention as defined by the appended claims.

REFERENCE NUMERALS USED IN THE DESCRIPTION 1 fuel-cell connector
10 connector body unit
10a fuel-receiving opening
10b fuel-discharge opening
11 connector body
111 connector-side connection element
12 connector-side valve
120 plug
13 nozzle
13a nozzle tip
14 spring member (resilient element)
20 stationary mechanism part
21 holder body
22 ratchet holder
23 first ring (sliding ring)
23 second ring (locking ring)
25 third ring (guide ring)
30 fuel cartridge
33 cartridge-side connector
34 cartridge-side valve
341 housing
342 stem
34a fuel-supply opening 34a
F fuel
S1 connection-side engagement means
S2 cartridge-side connection means
100 mobile phone (fuel-cell-using device)
100a fuel-inlet opening

What is claimed is:

1. A fuel-cell connector for releasable connection to a fuel cartridge comprising an interior filled with fuel to be supplied to a fuel cell, a fuel-supply opening which opens to the outside of the cartridge, a cartridge-side valve capable of opening or closing the aforementioned fuel-supply opening, and a cartridge-side connection element provided with the aforementioned cartridge-side valve, said connector being characterized by further comprising:
   a fuel-receiving opening that opens to the outside and communicates with the fuel-supply opening when the fuel cartridge is connected;
   a connector-side valve that opens and closes the fuel-receiving opening and performs an opening movement together with the cartridge-side valve under the effect of the first-insertion movement of the cartridge-side connection element;
   a connector body unit moveable in the insertion direction of the aforementioned cartridge-side connection element, containing the aforementioned connector-side valve and telescopically connected to the cartridge-side connection element;
   a resilient element for resisting movement of the connector body unit in the insertion direction; and
   a stationary mechanism part that surrounds the connector body unit, is provided with engagement means for engagement with the cartridge-side connection element, and is attached to a fuel-cell-using device; the connector operating so that when the aforementioned cartridge-side connection element is moved further from the first insertion position to the second insertion position, the aforementioned connector body unit is moved as a single unit with the cartridge-side connection element while the fuel-receiving opening and the fuel-supply opening are maintained in close proximity so that the aforementioned engagement means are engaged with the cartridge-side connection element, whereby the fuel cartridge is connected and fixed in the connected position.

2. The fuel connector of claim 1, further comprising a tubular connector-side element that surrounds the aforementioned connector-side valve, which projects from the fuel-receiving opening, and that projects to the side of connection with the cartridge-side connection element, the inner surface of said connector-side connection element being telescopically fitted onto a tip of the housing in which the aforementioned fuel-supply opening is formed.

3. The fuel connector of claim 2, wherein the tip of the connector-side valve is brought into contact with the cartridge-side valve so that the connector-side valve and the cartridge-side valve can move in the opening direction.

4. The fuel connector according to any of claim 3, wherein the connector-side valve opens prior to the cartridge-side valve and closes at a later time.

5. The fuel connector according to any of claim 4, wherein on the side opposite to the fuel-receiving opening, the connector body unit is provided with a nozzle that moves integrally with the connector body unit and has a fuel-discharge opening for discharging fuel that was received by the fuel-receiving opening, a tip on the side of the fuel-discharge opening of the nozzle being slidingly fitted into a tubular part that contains the aforementioned fuel-inlet opening for introduction of the fuel into the fuel cell.

6. The fuel connector according to any of claim 3, wherein, on the side opposite to the fuel-receiving opening, the connector body unit is provided with a nozzle that moves integrally with the connector body unit and has a fuel-discharge opening for discharging fuel that was received by the fuel-receiving opening, a tip on the side of the fuel-discharge opening of the nozzle being slidingly fitted into a tubular part that contains the aforementioned fuel-inlet opening for introduction of the fuel into the fuel cell.

7. The fuel connector according to any of claim 2, wherein the connector-side valve opens prior to the cartridge-side valve and closes at a later time.

8. The fuel connector according to any of claim 7, wherein, on the side opposite to the fuel-receiving opening, the connector body unit is provided with a nozzle that moves integrally with the connector body unit and has a fuel-discharge opening for discharging fuel that was received by the fuel-receiving opening, a tip on the side of the fuel-discharge opening of the nozzle being slidingly fitted into a tubular part that contains the aforementioned fuel-inlet opening for introduction of the fuel into the fuel cell.

9. The fuel connector according to any of claim 2, wherein, on the side opposite to the fuel-receiving opening, the connector body unit is provided with a nozzle that moves integrally with the connector body unit and has a fuel-discharge opening for discharging fuel that was received by the fuel-receiving opening, a tip on the side of the fuel-discharge opening of the nozzle being slidingly fitted into a tubular part that contains the aforementioned fuel-inlet opening for introduction of the fuel into the fuel cell.

10. The fuel connector of claim 1, wherein the tip of the connector-side valve is brought into contact with the cartridge-side valve so that the connector-side valve and the cartridge-side valve can move in the opening direction.

11. The fuel connector according to any of claim 10, wherein the connector-side valve opens prior to the cartridge-side valve and closes at a later time.

12. The fuel connector according to any of claim 11, wherein, on the side opposite to the fuel-receiving opening, the connector body unit is provided with a nozzle that moves integrally with the connector body unit and has a fuel-discharge opening for discharging fuel that was received by the fuel-receiving opening, a tip on the side of the fuel-discharge opening of the nozzle being slidingly fitted into a tubular part that contains the aforementioned fuel-inlet opening for introduction of the fuel into the fuel cell.

13. The fuel connector according to any of claim 10, wherein, on the side opposite to the fuel-receiving opening, the connector body unit is provided with a nozzle that moves integrally with the connector body unit and has a fuel-discharge opening for discharging fuel that was received by the fuel-receiving opening, a tip on the side of the fuel-discharge opening of the nozzle being slidingly fitted into a tubular part that contains the aforementioned fuel-inlet opening for introduction of the fuel into the fuel cell.

14. The fuel connector according to any of claim 1, wherein the connector-side valve opens prior to the cartridge-side valve and closes at a later time.

15. The fuel connector according to any of claim 14, wherein, on the side opposite to the fuel-receiving opening, the connector body unit is provided with a nozzle that moves integrally with the connector body unit and has a fuel-discharge opening for discharging fuel that was received by the fuel-receiving opening, a tip on the side of the fuel-discharge opening of the nozzle being slidingly fitted into a tubular part that contains the aforementioned fuel-inlet opening for introduction of the fuel into the fuel cell.

16. The fuel connector according to any of claim 1, wherein, on the side opposite to the fuel-receiving opening, the connector body unit is provided with a nozzle that moves integrally with the connector body unit and has a fuel-discharge opening for discharging fuel that was received by the fuel-receiving opening, a tip on the side of the fuel-discharge opening of the nozzle being slidingly fitted into a tubular part that contains the aforementioned fuel-inlet opening for introduction of the fuel into the fuel cell.

* * * * *